Oct. 17, 1967 M. G. LEONARD ETAL 3,348,180
ELECTRICAL INDUCTIVE APPARATUS HAVING A
MULTI-CONDUCTOR BUSHING
Filed June 18, 1964 4 Sheets-Sheet 1

United States Patent Office 3,348,180
Patented Oct. 17, 1967

3,348,180
ELECTRICAL INDUCTIVE APPARATUS HAVING A MULTI-CONDUCTOR BUSHING
Merrill G. Leonard, Fowler, Ohio, and Leonard L. Wright, Sharon, Pa., assignors to Westinghouse Electric Corporation, Pittsburgh, Pa., a corporation of Pennsylvania
Filed June 18, 1964, Ser. No. 376,193
2 Claims. (Cl. 336—90)

This invention relates in general to electrical inductive apparatus and more particularly to electrical inductive apparatus in which all electrical connections are made internal to the apparatus.

With the increased usage of underground electrical distribution systems, which utilize electric cable instead of open-type overhead line conductors, it has become necessary to provide special terminations for the electric cable at the transformer. One of the requirements of the termination is to eliminate any exposed live surfaces.

The termination should exclude moisture, both from the interior portion of the cable and from the transformer. Further, it is desirable to be able to quickly make and break the electrical connection between the incoming electric cable and the transformer, without disturbing the transformer seal and without reducing the insulation level at the junction point.

When the transformer is disposed in a vault-type underground enclosure, the special termination is usually required only for the incoming high voltage line, with the conventional low voltage bushing which seals the transformer against moisture being suitable. However, where the transformer is directly buried in the earth, without a complete vault or enclosure to protect it, a special termination which excludes moisture from the termination is also desirable for the lower voltage or load conductors.

Accordingly, it is an object of this invention to provide new and improved electrical inductive apparatus for underground electrical systems.

Another object of this invention is to provide new and improved inductive apparatus for underground electrical systems in which all electrical connections are made inside the inductive apparatus.

A further object of this invention is to provide a new and improved bushing and disconnecting means for inductive apparatus in which electrical cables may be quickly connected to and disconnected from inductive apparatus without breaking the moisture seal of the inductive apparatus.

Another object of the invention is to provide a new and improved low voltage bushing for electrical inductive apparatus which requires no external electrical connections between the inductive apparatus and the load control point.

Briefly, the present invention accomplishes the above-cited objects by providing an incoming termination at the inductive apparatus for an electrical cable which serves both as an electrical bushing and as means for making and breaking the electrical connection between the transformer and the electric cable. This incoming termination is comprised of two basic portions, with the first portion being constructed of an electrical insulating material having a generally hollow, elongated shape. The first portion has an opening at one end and is closed at the other, with an electrical connection being disposed near its closed end. The electrical connection extends through the wall of the first portion in sealed relation thereto, where it is connected to the appropriate winding disposed within the casing of the apparatus. The second portion includes the end of the electric cable to be connected to the inductive apparatus, with strengthening or stiffening means being disposed over a predetermined length of the end of the cable. Stress cone means flares out from the cable which reduces the stress concentration at the ending of the electrical shielding means and also serves to form part of the mounting means for holding and sealing the second portion relative to the casing of the inductive apparatus. The strengthening portion of the electric cable is inserted into the opening of the first portion and an exposed portion of conductor at the end of the electric cable makes a friction or pressure electrical contact with the electrical connection disposed within said first portion. The first portion is disposed to extend inwardly in sealed relation with the casing of the electrical apparatus, with the opening in the first portion being in substantial registry and sealed relation with an opening in the casing. The stress cone and mounting means grounds the cable shield to the electrical apparatus and seals the electrical connection inside the opening of said first portion.

The low voltage electrical insulating bushing is formed with a plurality of load conductors molded in sealed relationship therewith, with the load conductors making electrical contact within the bushing with connecting means which extend from one end of the bushing. The low voltage bushing is disposed in sealed relation with an opening in the casing of the electrical inductive apparatus, with the connecting means being disposed within the casing of the inductive apparatus and connected to the appropriate electrical windings. Therefore, all of the load conductors emerge from the same electrical bushing and extend outwardly therefrom, with the load conductors being of sufficient length to reach the load control point. This eliminates any external electrical connections between the low voltage bushing and the load control point.

Further objects and advantages of the invention will become apparent as the following description proceeds and features of novelty which characterize the invention will be pointed out in particularity in the claims annexed to and forming a part of this specification.

For better understanding of the invention, reference may be made to the accompanying drawings in which:

FIG. 10 is an enlarged side elevation, partially in section, of the low voltage bushing shown in FIG. 8.

Figure 1:
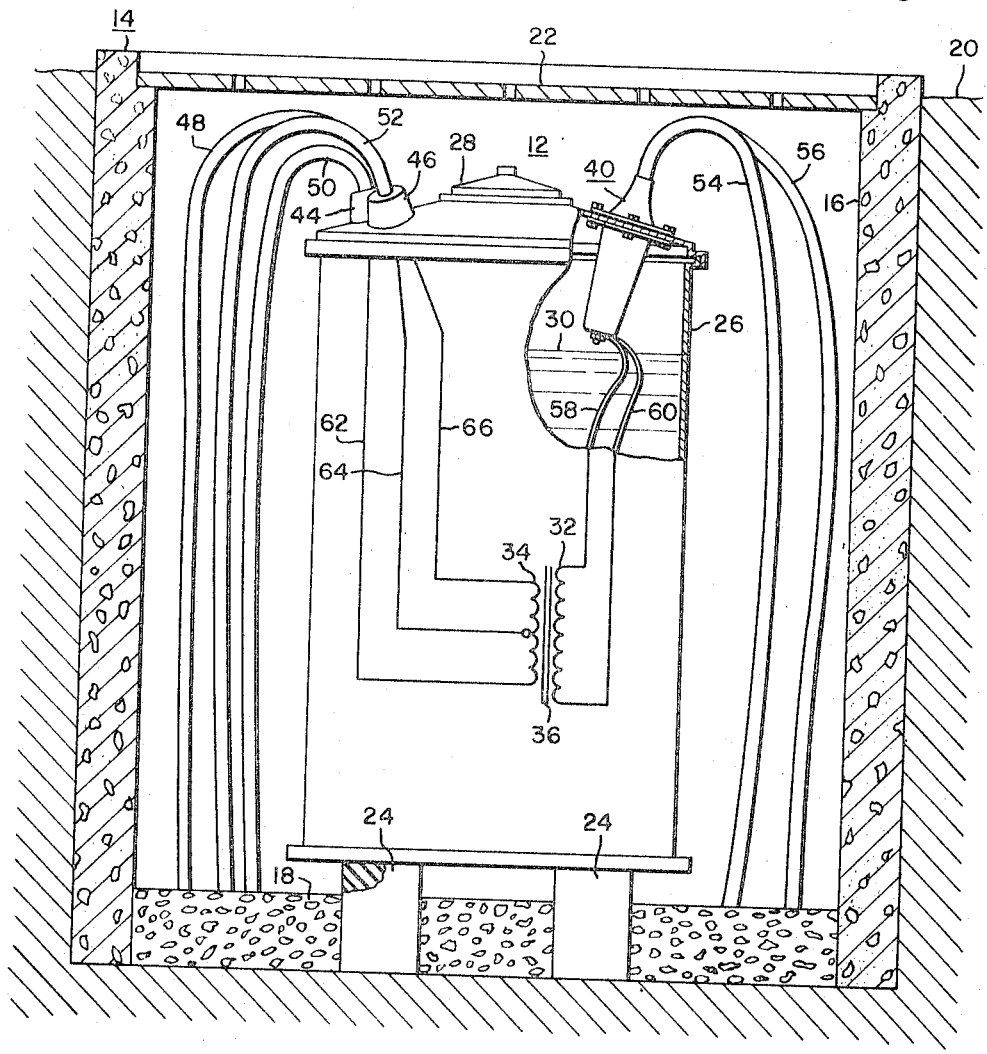
FIGURE 1 is a side elevation, partly in section and partly schematic, illustrating a transformer disposed in an underground vault and utilizing an electric cable termination constructed according to the teachings of this invention.

Referring now to the drawings, and FIG. 1 in particular, there is shown a transformer 12 disposed in a vault-like structure 14, which may have side wall portions 16 constructed of concrete, or other suitable material, and a bottom portion 18 which may be loose gravel to allow drainage. The vault 14 is disposed in the earth 20 to a predetermined level, and a top or cover 22 may be disposed on the vault 14 to provide access to the transformer 12 and also to allow cooling air to enter the enclosure 14, if desired. The transformer 12 may be disposed on mounting blocks 24, which allow circulation of cooling air under the transformer 12.

The transformer 12 includes a suitable casing 26 having a cover 28 disposed thereon, and liquid dielectric 30 filling the casing 26 to a predetermined level. Transformer 12 may contain conventional first and second winding portions 32 and 34, respectively, inductively disposed on a magnetic core 36. Since the windings 32 and 34 and magnetic core 36 are conventional, they are shown in schematic form.

In this particular embodiment, two incoming cable terminations, 38 and 40, are shown, although the invention is applicable to any number of cable terminations. Three low voltage bushings 42, 44 and 46 are shown, and in this embodiment they may be of any conventional construction. Conductors 48, 50 and 52 are connected to low voltage bushings 42, 44 and 46, respectively, and they may leave the vault 14 through the side wall portions 16, or bottom 18, for connection to a control point and load (not shown).

Figure 2:
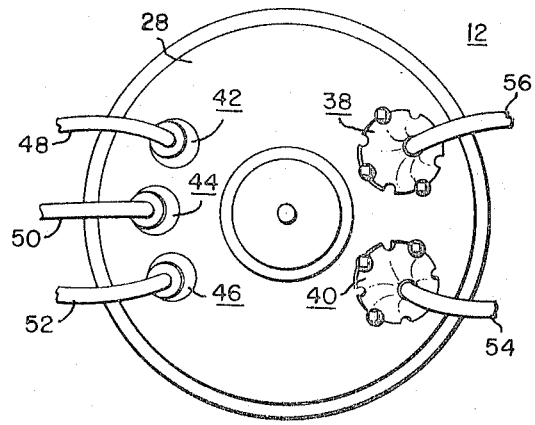
FIG. 2 is a top plan view of the transformer shown in FIG. 1.

In like manner, the incoming electrical cables 54 and 56 are connected to cable termination structures 40 and 38, respectively. As shown in FIG. 1, cable termination structures 38 and 40 extend through the cover 28 of transformer 12, and are connected to electrical winding 32 through conductors 58 and 60. Low voltage bushings 42, 44 and 46 are also disposed on the cover 28 of transformer 12, and they are connected to electrical winding 34 through electrical conductors 62, 64 and 66. FIG. 2 shows a top plan view of transformer 12 illustrating how the cable terminations 38 and 40 and low voltage bushings 42, 44 and 46 may be mounted on the cover 28.

Figure 3:
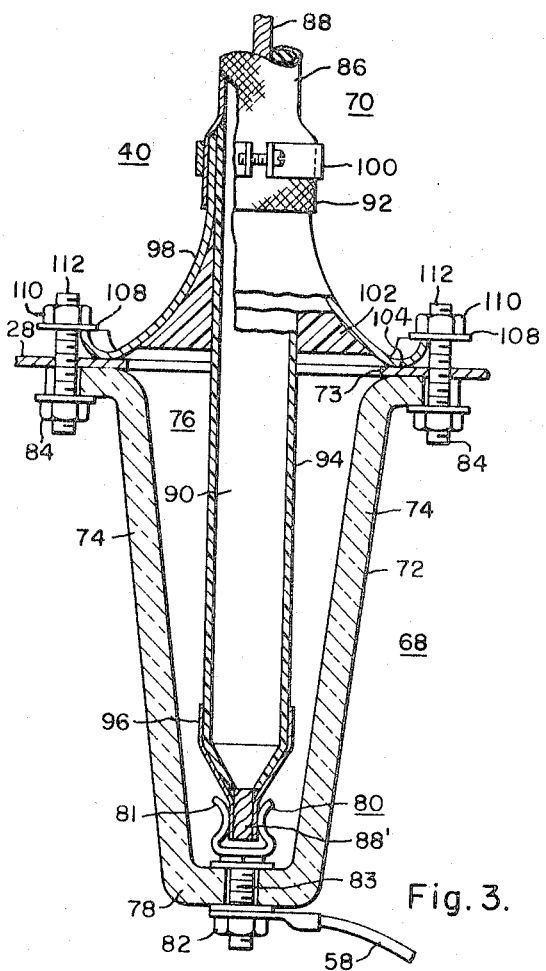
FIG. 3 is an enlarged elevation, partially in section, showing the electric cable termination of FIG. 1 in detail.

Since cable terminating structures 38 and 40 are similar, only cable termination 40 will be described in detail. Cable termination 40 is shown in an enlarged side elevation, partially in section in FIG. 3. Cable termination 40 includes two basic portions, a first portion 68 and a second portion 70. The first portion 68 includes a generally hollow, elongated member 72 which may be constructed of an electrically insulating material such as porcelain, polyester glass, or any other suitable electrical insulating material. Insulating member 72 has side wall portions 74 which define an opening 76 at one end thereof and a wall portion 78 at the other end. First and second electrical connecting means, 80 and 82, respectively, are disposed on either side of end portion 78, with an electrical conductor 83 connecting the first and second electrical connecting means 80 and 82. Electrical connector 80 may be formed of an electrically conductive material, with contact fingers 81 constructed to have a predetermined amount of spring tension. Electrical connector 80 may be formed of beryllium-copper, or other suitable electrical conductor, which will retain spring tension, and is disposed near the bottom of the opening 76 and electrically connected to conductor 83. Conductor 83 is disposed through the end portion 78, in sealed relationship therewith, and is then connected to the second electrical connector 82, which may be a conventional nut and bolt arrangement. Insulating member 72 is mounted in sealed engagement with the underside of cover 28 and in substantial registry with an opening 73 in said cover. As will hereinafter be described, insulating member 72 may also be mounted on the internal sidewall of casing 26. The electrical conductor 58 from winding 32 of transformer 12 may be connected to electrical connector 82, as shown in FIG. 3. Electrical insulating member 72 is held in sealed relationship with cover 28 by fastening means, such as nut and bolt arrangements 84, or any other suitable fastening means.

The second portion of cable terminating means 40 includes electric cable 86 having a conducting portion 88 surrounded by electrical insulating material 90, and electrical shielding means 92 constructed of suitable electrical conducting material.

In order to strengthen or stiffen electrical cable 86, tubing 94, constructed of an electrical insulating material, such as plastic, may be telescoped over a portion of electric cable 86 that has electrical shielding means 92 removed for a predetermined length. The electrical insulating material 90 is also removed for a predetermined length, as shown in FIG. 3, to leave an exposed portion 88′ of electrical conductor 88. In order to strengthen the exposed portion 88′ of electrical conductor 88, a hollow cylindrical conducting member 96 may be telescoped over the exposed portion 88′ of conductor 88 and a predetermined portion of tubular member 94.

In order to form a stress cone for termination of electrical shielding means 92 and connect shielding means 92 to the casing or cover 28 of transformer 12, a flared member 98, constructed of an electrically conductive material may be disposed over electric cable 86 in electrical contact with shielding means 92. Flared member 98 starts at the surface of electric cable 86 and flares outwardly towards the exposed end 88′ of electrical conductor 88, with clamping means 100 securing flared member 98 to the electric cable 86 and insuring a good electrical contact between shielding means 92 and flared member 98. Flared member 98 also serves as part of the holding means for maintaining the desired position of the electric cable 86 relative to the cover 28 and the insulating portion 72 of the cable termination 40. Flared member 98 forms a stress cone for the termination of shielding means 92, and may have the opening formed by the flared portion filled with an electrically insulating material 102, such as an epoxy, to form an integral assembly comprising the electric cable 86 and flared member 98.

When electric cable 86 is to be connected to transformer 12, the electric cable assembly is inserted into the opening 73 formed by the opening in the cover 28 and the opening 76 in electrical insulating member 68, until the flared member 98 makes physical and electrical contact with cover 28 at point 104. Actually, point 104 is a continuous line between the flared member 98 and cover 28. When flared member 98 is in electrical contact with cover 28 and properly seated thereto, the conducting end of electrical cable 86, including electrical conducting member 96 will be releasably engaged by electrical connector 80, with the spring tension in the fingers 81 of electrical connector 80 providing a strong friction grip on electrical conducting member 96, thus connecting the conductor 88 of electric cable 86 to transformer winding 32 through electrical conductor 58.

Figure 4:
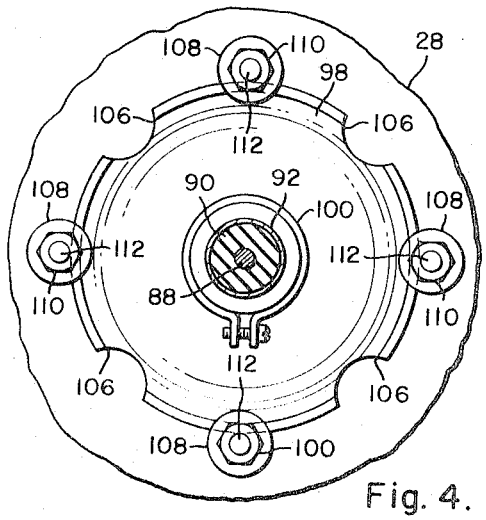
FIG. 4 is a top plan view of the cable termination shown in FIG. 3.

In order to securely hold flared member 98 in the desired relationship with cover 28, flared member 98 is inserted into the opening 76 in electrical insulating member 68 with cutout portions 106, shown in FIG. 4, aligned with washer members 108. Then by turning flared member 98 a few degrees clockwise or counterclockwise, the turned-up portion of flared member 98 will move under washer members 108. Nut members 110 may then be tightened on bolt members 112, to securely hold flared member 98 and electric cable 86 in the desired position. When it is desired to break the electrical connection between electric cable 86 and transformer winding 32, it is merely necessary to loosen nut members 110, turn the cable and flared member 98 until cutout portions 106 are aligned with washer members 108, and move cable 86 perpendicularly away from cover 28. This automatically breaks the electrical connection between the electrical connector 80 and electrical conducting member 96. Thus, cable terminating structure 40 performs the function of providing a quick but effective means for making and breaking the electrical connection between the electric cable 86 and winding 32 of transformer 12, without destroying the moisture seal of the transformer. Cable terminating structure 40 also provides the function of an electrical bushing, as electrical insulating member 72 provides adequate insulation for the junction point between electrical conducting member 96 and electrical connector 80.

FIG. 1 shows electrical insulating member 72 disposed above the liquid dielectric 30, however if additional creep strength is required, the electrical insulating portion 68 may be disposed within the liquid dielectric.

Another function of cable terminating structure 40 is to terminate the shielded cable 86 without a high concentration of electrical stress. This is done by means of flared member 98 which acts as a stress cone and connects shielding means 92 to the electrically conductive cover 28 and casing 26 of transformer 12.

Although electrical connector 80 is shown with fingers 81 under spring tension, any type of electrical connector which would releasably engage electrically conductive member 96, would be suitable.

Figure 6:
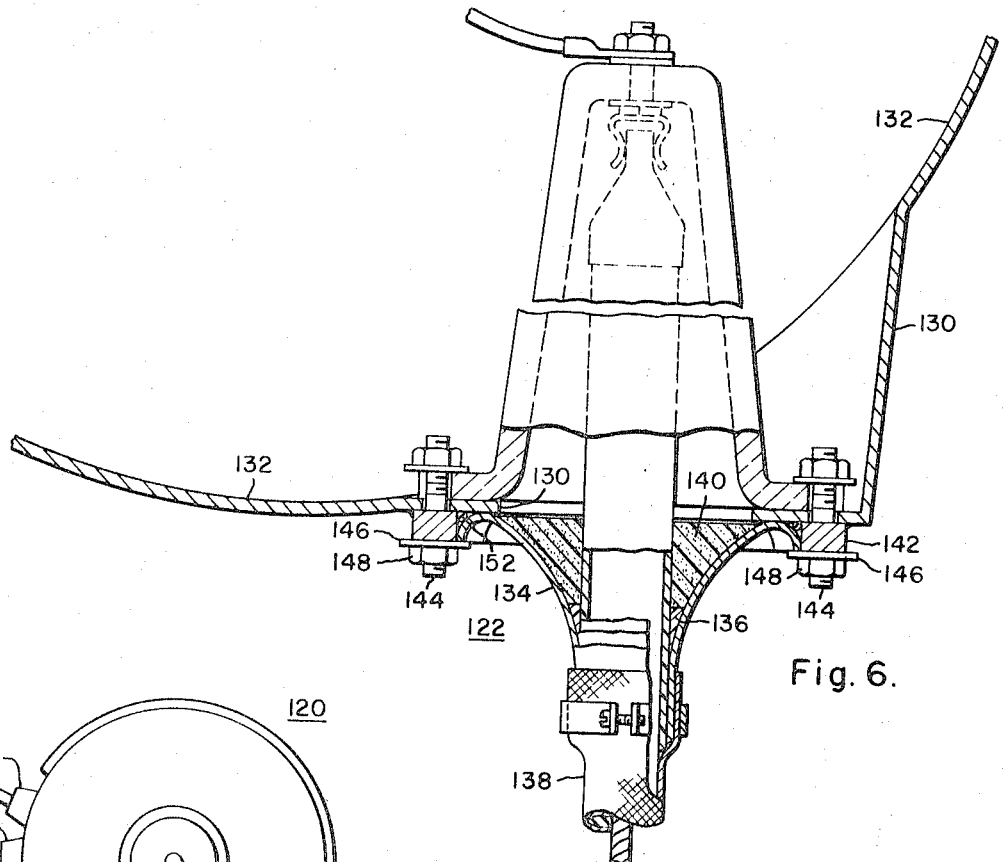
FIG. 6 is an enlarged side elevation, partially in section, showing the termination of FIG. 5.
Figure 5:
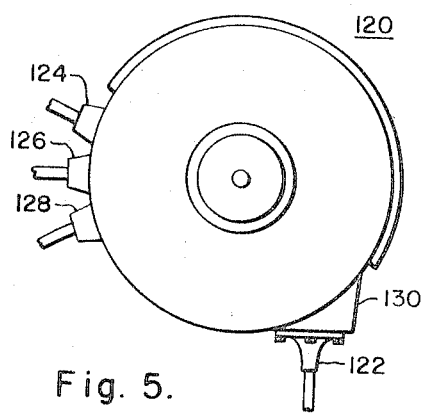
FIG. 5 is a top plan view of a transformer illustrating how the termination of FIG. 3 may be mounted on the side wall of a transformer.

Although cable terminating structure 40 is shown mounted on the cover 28 of transformer 12, it may also be mounted to the side wall of casing 26. FIG. 5 shows a top plan view of a transformer 120, with cable terminating means 122 being mounted on the side wall of the transformer, as well as low voltage bushings 124, 126, and 128 being disposed on the side wall of transformer 120. FIG. 6 shows cable terminating structure 122 in greater detail, with a structure 130 extending outwardly from casing 132 to form a suitable mounting location for cable terminating structure 122. Cable terminating structure 122 is very similar to cable terminating structure 40, except for illustrating an alternate way of forming a suitable stress cone and an alternate method of mounting the terminating structure 122 relative to the casing 132. In particular, a flared stress cone 134, formed of an electrically conductive material, may have an electrical insulating material 136 disposed for a predetermined distance along the electric cable 138, and the remaining portion of the opening formed by flared member 134 may be filled with an electrical stress grading material 140, such as particles of silicon carbide dispersed in a carrier of epoxy resin.

Figure 7:
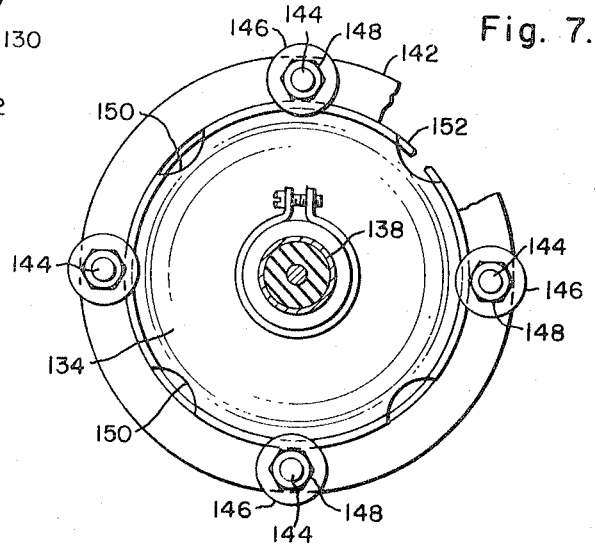
FIG. 7 is a top plan view of the cable termination shown in FIG. 6.

FIGS. 6 and 7 also illustrate a method of insuring that a fluid-tight seal is obtained between flared member 134 and extension 130 of casing 132. A ring 142 of predetermined diameter may be attached to extension 130 by any suitable means, such as tack welding, with bolts 144 suitably attached to ring 142. A washer member 146 is disposed over bolt member 144 and a nut member 148 is threadably engaged with bolt member 144. When cable structure 122 is inserted into position, an arrangement similar to the one hereinbefore described may be utilized, wherein cutout portions 150 in flared member 134 are aligned with washer members 146. Flared member 134 and cable 138 are turned a few degrees to cause the turned-up portion of flared member 134 to move under washer members 146. Then, by tightening nut members 148 on bolt members 144 flared member 134 is moved into a tight, sealed relationship with extended portion 130 of casing 132. Additional sealing means, such as gasket 152, may be inserted between ring member 142 and the turned-up portion of flared member 134, to provide additional insurance against moisture entering the enclosure where the electrical contact between the cable 138 and connecting means 80 is formed.

When a quick-disconnect feature is not desired, a cable terminating structure 122 as shown in FIG. 6 may still be utilized, since the cover of the electrical apparatus may be removed to make the electrical connection between the cable and the winding of the transformer. Cable terminating structure 122 still has advantages in this instance, because the combination stress cone and mounting means eliminates the requirement of a conventional electrical bushing wherein the electrical connection would necessarily require certain live terminals to be exposed.

Figure 9:
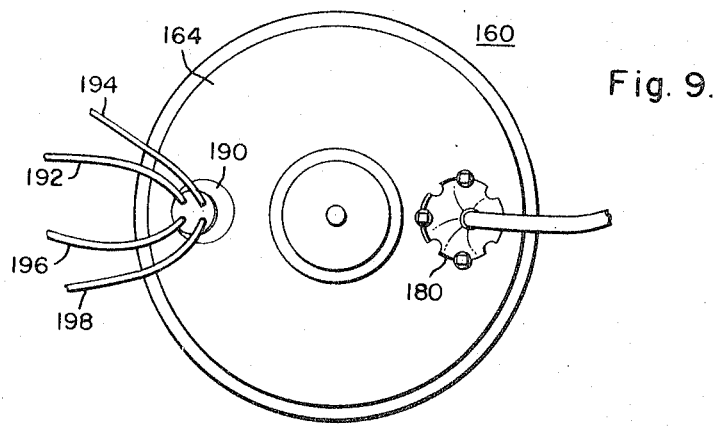
FIG. 9 is a top plan view of the transformer shown in FIG. 8.
Figure 8:
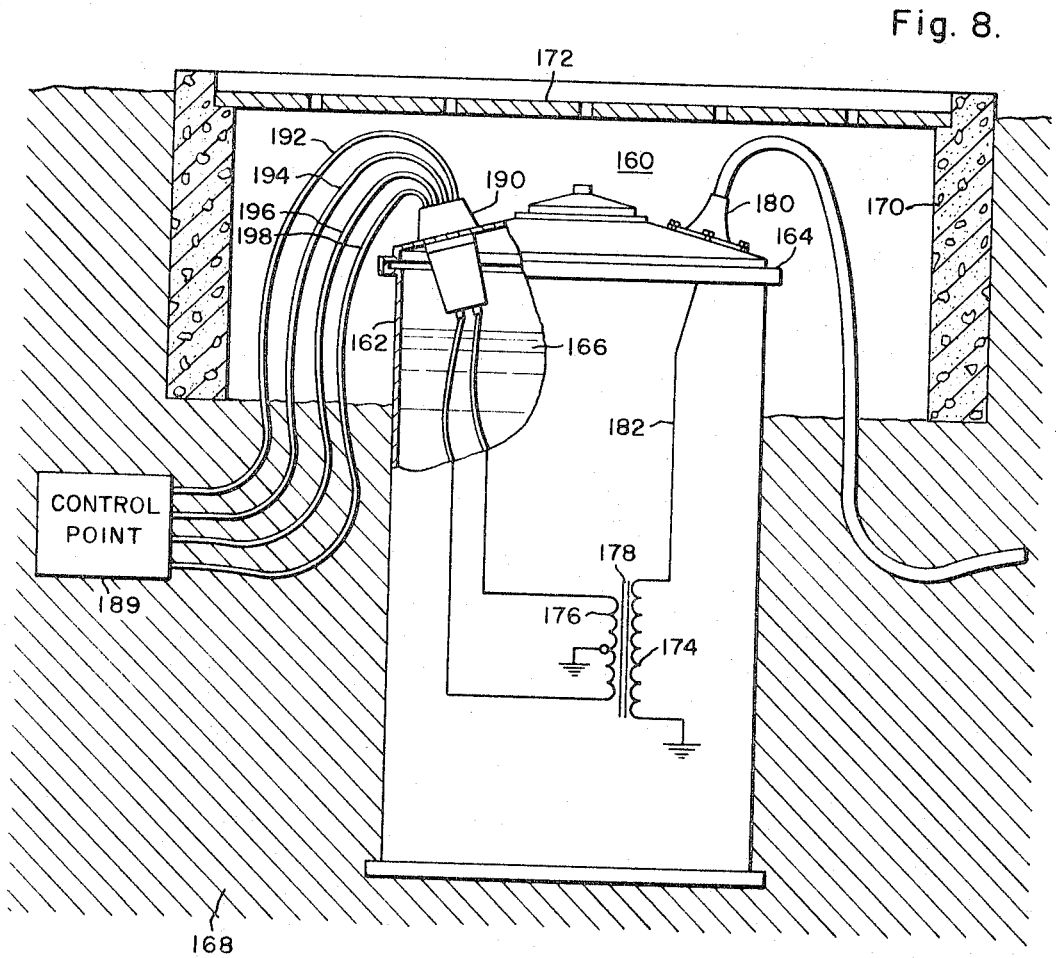
FIG. 8 is a side elevation, partially in section and partially schematic, illustrating a direct buried transformer and low and high voltage bushings constructed according to the teachings of this invention.

In certain instances, it is desirable to actually bury the transformer directly in the earth, without the benefit of a protective enclosure surrounding the whole transformer. In such instances, the secondary or low voltage bushings must not contain any exposed live surfaces, because of the moisture problems involved with direct buried transformers. FIGS. 8 and 9 illustrate a transformer 160 having a casing 162 and cover 164, with the casing 162 being filled to a predetermined level with liquid dielectric 166. The transformer 160 is buried directly in the earth 168 to a predetermined level, with a very simple protective covering, which may comprise side wall portions 170 of concrete, or other suitable materials, and having a protective cover 172 disposed thereon. Casing 162 may contain first and second windings 174 and 176 respectively, disposed in inductive relation with a magnetic core 178. Since first and second windings 174 and 176 and magnetic core 178 are of conventional construction, they are shown schematically. Cable terminating structure 180, which may be of the type hereinbefore described, is connected to the first winding 174 through electrical conductor 182. Only one cable terminating structure 180 is illustrated in this particular embodiment, however, it is to be understood that a plurality of cable terminating means may be used in certain instances.

When direct buried transformers are utilized, they are commonly located very close to the control point 189 and intended load. Therefore, a single electrical bushing may be utilized which has conductors of sufficient length to reach to the load control point 189. More specifically, an electrical bushing 190 may be disposed through the cover 164 of transformer 160 with electrical conductors 192, 194, 196, and 198 disposed in sealed relation with bushing 190. Electrical conductors 192, 194, 196 and 198 are of sufficient length to reach the intended load control point 189, thus eliminating any external connections between the load control point and transformer 160. Although four conductors are shown emerging from electrical bushing 190, it is to be understood that any number of electrical conductors may be utilized.

Figure 11:
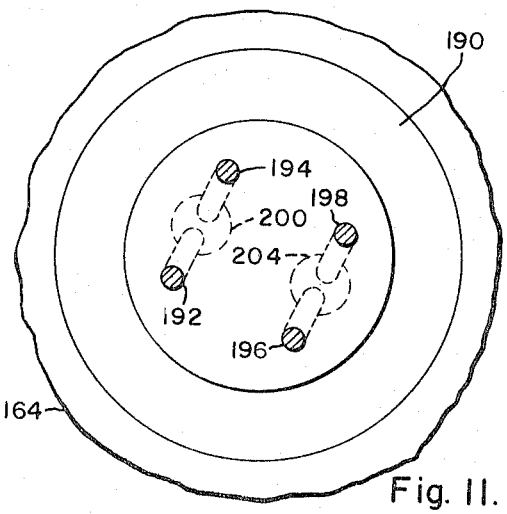
FIG. 11 is a top plan view of the low voltage bushing shown in FIG. 10.

FIGURES 10 and 11 illustrate electrical bushing 190 and conductors 192, 194, 196 and 198 in greater detail. In order to form the tight sealed relationship between conductors 192, 194, 196 and 198, they may be molded into the electrical insulator 190 at the time of manufacture. In order to connect the electrical conductors to the electrical winding 176 within transformer 160, suitable connecting means 200 and 204 may be disposed within electrical insulator 190 and connected to connecting means 206 and 208, which project from one end of electrical insulator 190. Electrical conductors 192, 194, 196 and 198 are not continued directly through the electrical insulator 190 into the transformer compartment, in order to prevent the pressure-siphon effect of hot liquid dielectric escaping through the stranded conductor. Conductors 192, 194, 196, and 198 may be color coated to indicate which winding leads are connected to which conductors.

The invention disclosed herein has many advantages, one of which is the fact that electrical inductive apparatus is provided in which there are no exposed live surfaces. Further, the electrical connections and the transformer tank are sealed against moisture. Still further, the incoming electric cable may be connected to or disconnected from the transformer quickly and effectively, without damaging the transformer moisture seal. A transformer constructed according to the teachings of this invention, having cable terminations and terminations for the low voltage conductors constructed according to the teachings of this invention, may be mounted below ground level in a subway-type vault or may be direct buried in the earth, without danger of moisture entering the internal portions of the cable, the electrical connections, or the transformer itself.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. Electrical inductive apparatus comprising a casing having:

at least one opening therein for receiving an electrical bushing, at least one electrical winding disposed within said casing having at least first and second electrical terminals connected to electrically different portions of the winding, an electrical insulating bushing disposed in said at least one opening, said electrical insulating bushing including a generally cylindrical body member having first and second ends, formed of solid electrical insulating means, at least first and second electrically conductive members, each having first and second ends, with their first ends being embedded in said body member and their second ends extending outwardly from the second end of said body member into said casing, means connecting the second ends of each of said first and second electrically conductive members with the first and second terminals on said electrical winding, respectively, a plurality of stranded electrically conductive members having first and second ends, with their second ends being embedded in said body member and their first ends extending outwardly from the first end of said body member, and connector means embedded in said body member which electrically connect certain of said plurality of stranded electrically conductive members to the first end of said first electrically conductive member, and electrically connect the remaining stranded electrically conductive members to the first end of said second electrically conductive member.

2. The electrical inductive apparatus of claim 1 wherein:

at least two stranded electrically conductive members are connected to each of said first and second electrically conductive members by said connector means.

References Cited

UNITED STATES PATENTS

| | | | |
|---|---|---|---|
| 2,280,711 | 4/1942 | Machlett et al. | 174—74 X |
| 2,285,529 | 6/1942 | Papp | 174—75 |
| 2,396,283 | 3/1946 | Papst | 174—73 |

FOREIGN PATENTS

| | | |
|---|---|---|
| 1,241,785 | 1960 | France. |

LARAMIE E. ASKIN, *Primary Examiner.*

T. J. KOZMA, *Assistant Examiner.*